Oct. 6, 1959  N. A. WAHL  2,907,066
METHOD AND APPARATUS FOR MAKING SEPARABLE FASTENERS
Filed March 25, 1954  6 Sheets-Sheet 2
FIG. 2
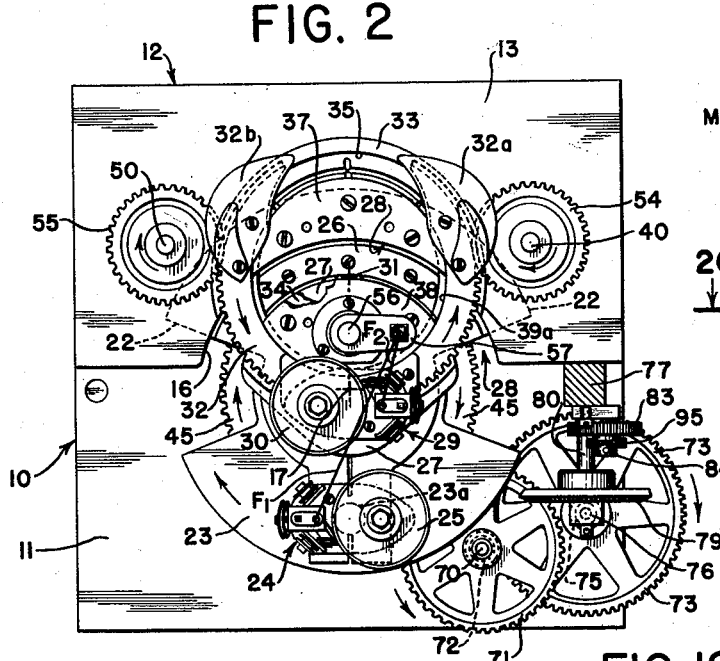
FIG. 20
FIG. 19
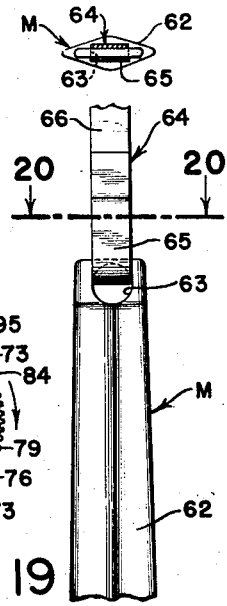
FIG. 3
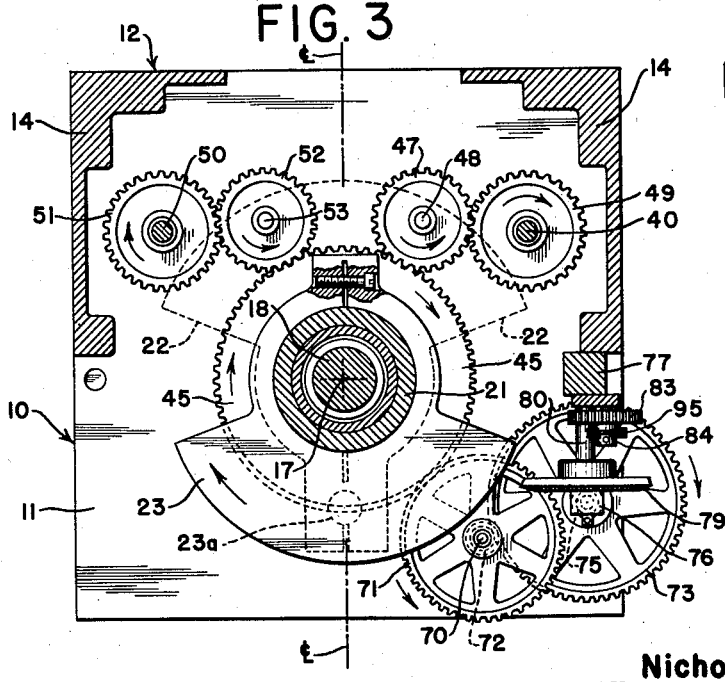
FIG. 18
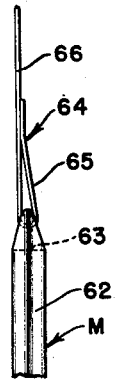
INVENTOR.
Nicholas A. Wahl
BY
ATTORNEY Oct. 6, 1959          N. A. WAHL          2,907,066

METHOD AND APPARATUS FOR MAKING SEPARABLE FASTENERS

Filed March 25, 1954          6 Sheets-Sheet 3

INVENTOR.
Nicholas A. Wahl
BY
ATTORNEY.

Oct. 6, 1959  N. A. WAHL  2,907,066
METHOD AND APPARATUS FOR MAKING SEPARABLE FASTENERS
Filed March 25, 1954  6 Sheets-Sheet 4

INVENTOR.
Nicholas A. Wahl
BY
ATTORNEY

Oct. 6, 1959 N. A. WAHL 2,907,066
METHOD AND APPARATUS FOR MAKING SEPARABLE FASTENERS
Filed March 25, 1954 6 Sheets-Sheet 5

INVENTOR.
Nicholas A. Wahl
BY
ATTORNEY

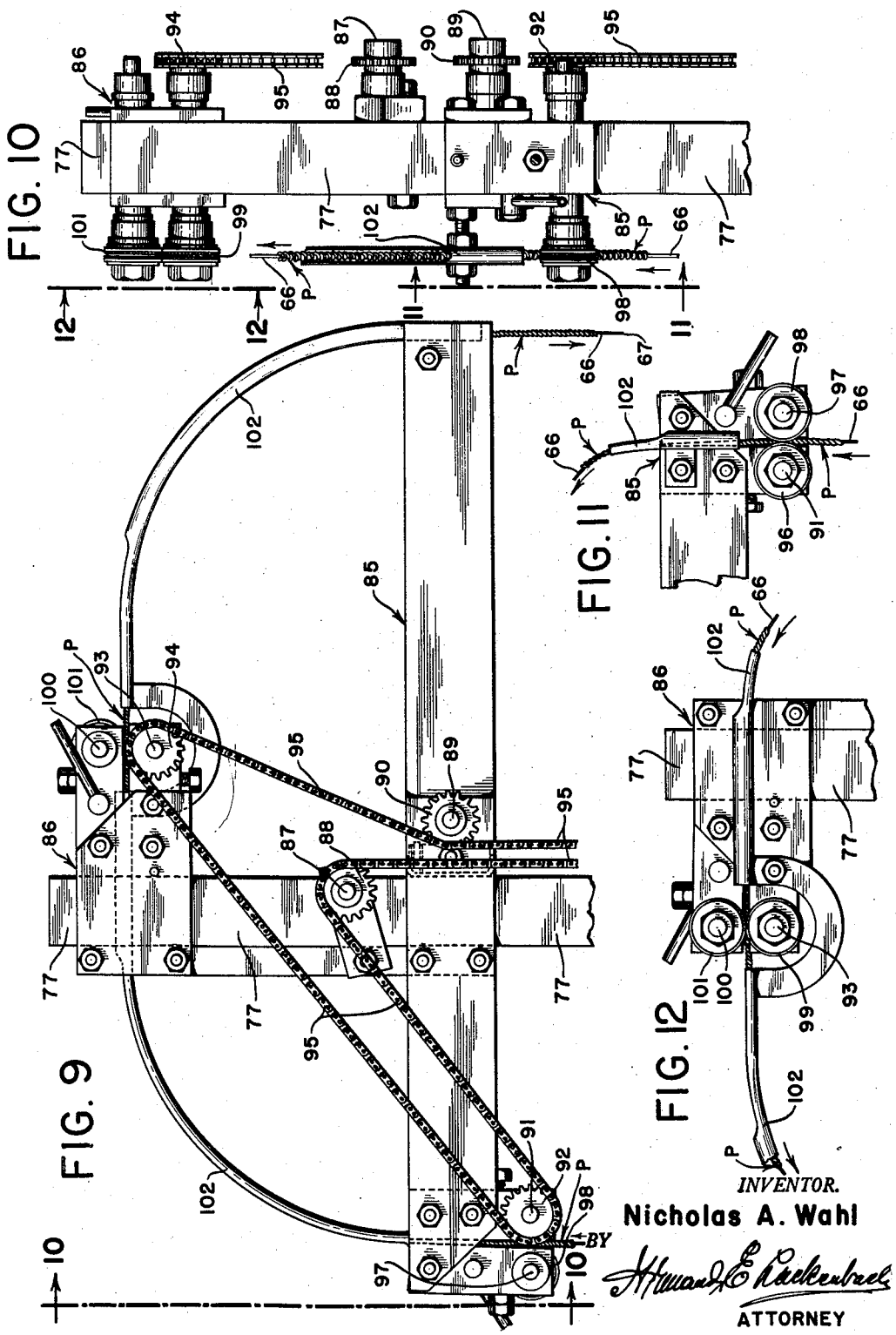

United States Patent Office 2,907,066
Patented Oct. 6, 1959

2,907,066

METHOD AND APPARATUS FOR MAKING SEPARABLE FASTENERS

Nicholas A. Wahl, New York, N.Y., assignor to Wahl Brothers, New York, N.Y., a partnership Application March 25, 1954, Serial No. 418,491

6 Claims. (Cl. 18—1)

This invention relates to apparatus and method for making cooperating slide fastener elements, such elements being releasably interlocking coils of filaments; and the general object is to provide novel and efficient apparatus of this class for automatically fabricating interlocking fastener elements of the coil type as a continuous product from which desired lengths may be cut for the manufacture of slide fasteners.

Interlocking slide fastener elements of this type were originally disclosed and claimed in my United States Patent No. 2,300,442, issued November 3, 1942, and are also shown in my United States Patents Nos. 2,541,728 and 2,541,729, both issued February 13, 1951. These latter patents relate to apparatus and method for making such fastener elements. The present invention is an improvement on the disclosures of these latter patents. The elements are two oppositely directed, but otherwise similar, coils formed of like filaments of material which may be permanently set in coiled condition. A particular feature of the filament employed is that its width is greater than its thickness. For example, the cross section may be, and preferably is, substantially similar to a half circle, whereby one side of the filament is round and the opposite side flat. This shape of filament is illustrated herein. Obviously the longitudinal dimension of the cross section is twice the transverse dimension and the filament may be readily coiled with its flat side against a mandrel. However, filaments having other cross sectional shapes might well be used provided the longitudinal and transverse dimensions are markedly different. It is the presence of this difference that renders it possible for the two oppositely directed coils to interlock if formed simultaneously on a suitable mandrel with wider sides of the filaments turned therearound. If the filaments were of circular cross section no positive interlocking effect would be had, and the two coils could easily be separated.

Where the oppositely directed coils are formed of filaments having cross section of the character described above, the coils will remain interlocked in the absence of axial disturbance; but the coils may be readily separated by sequentially bending the two coils away from each other, and slightly opening adjacent loops, of the two coils whereby the interlock is destroyed in a progressive manner from one end of the pair of coils to the other end thereof. Conversely the separated coils may be rejoined, if at least a few loops of the coils are still interlocked at, say, near one end of the pair, by sequentially bending and slightly opening adjacent loops of the two coils and guiding the unjoined loops into neutral engagement. Thus the oppositely directed filament coils form ideal cooperating elements for slide fasteners.

Another object is to provide such apparatus for making fastener elements of the described type from a thermoplastic such as nylon. The availability of a thermoplastic as the material of the filaments is highly desirable due to its light weight, strength, and appearance.

Herein, by way of illustration, the apparatus is shown and described as adapted particularly for the manufacture of slide fastener elements of plastic; but it will be manifest that the apparatus may be adapted, without essential change, to the manufacture of elements of other materials, such as metallic filaments.

Other objects of the invention include the provision of apparatus and method for forming a pair of coils adapted to be separably joined longitudinally and released with a slider riding thereon; for fabricating simultaneously and continuously from a pair of plastic filaments a pair of releasably interlocking coils useful in the construction of a slide fastener; and for fabricating simultaneously and continuously a pair of cooperating elements for a slide fastener wherein said elements are the loops of a pair of releasably interlocking coils.

These and other objects and advantages of the present invention will be more fully understood from the following description and from the drawing in which one embodiment of the invention is shown.

In the drawing:

Fig. 2 is a plan view of the apparatus, partly in section according to the index 2—2 of Fig. 1;

Fig. 3 is the section 3—3 of Fig. 1;

Figure 1:
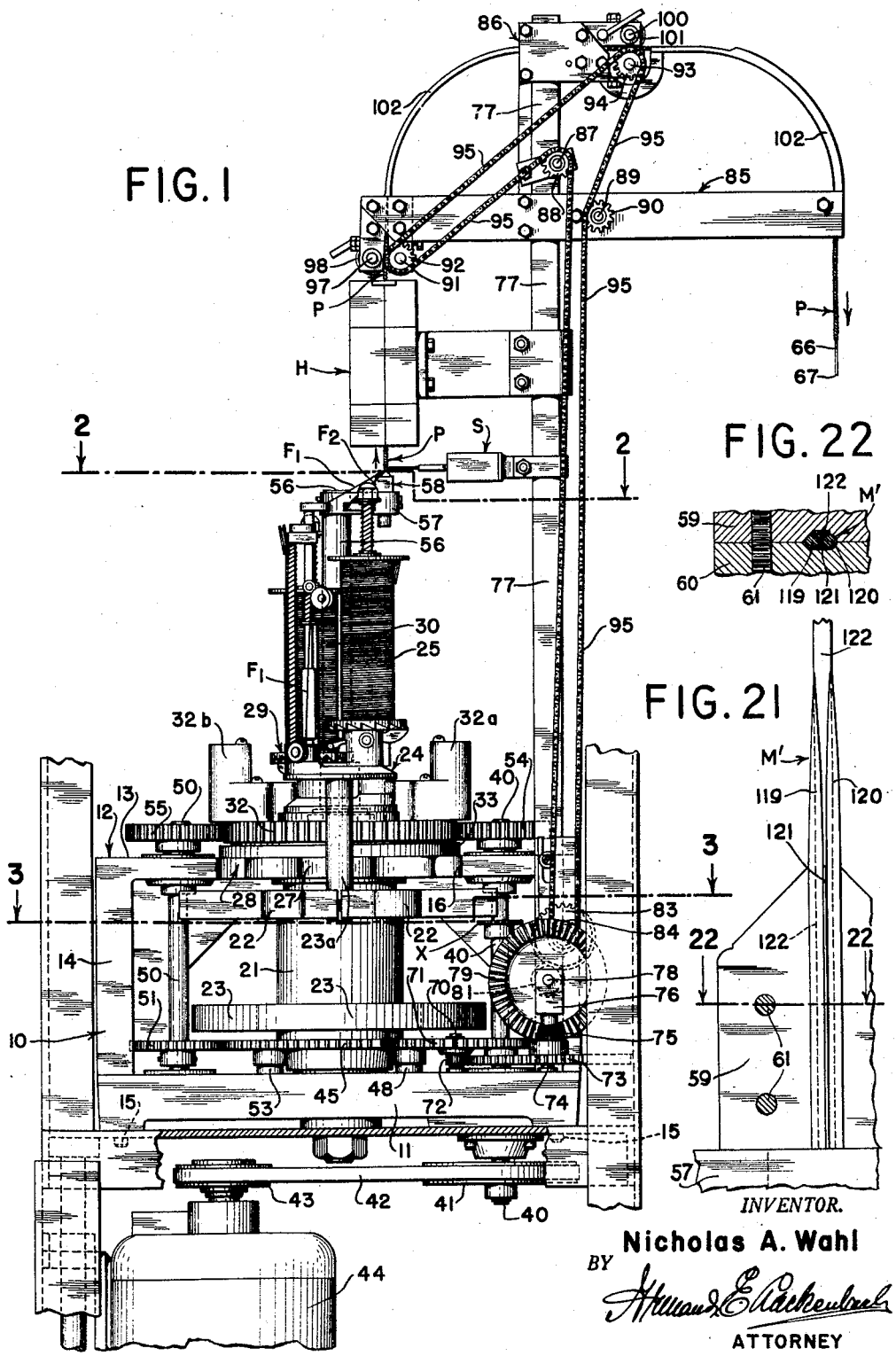
Fig. 1 is an elevational view of the apparatus.
Figure 4:
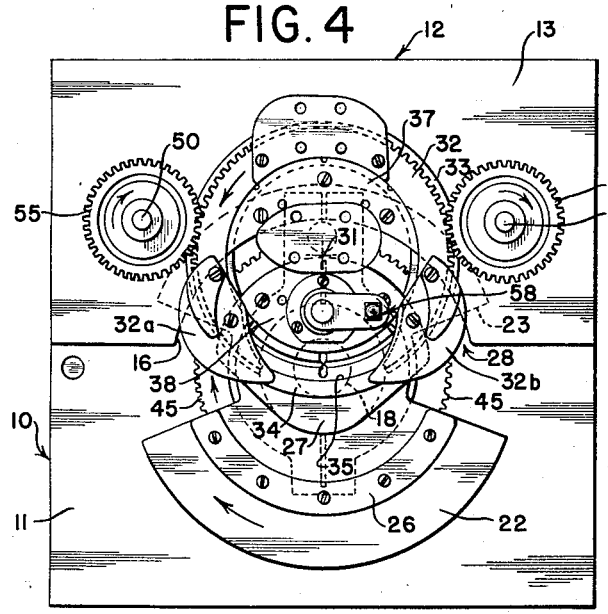
Figures 16, 17:
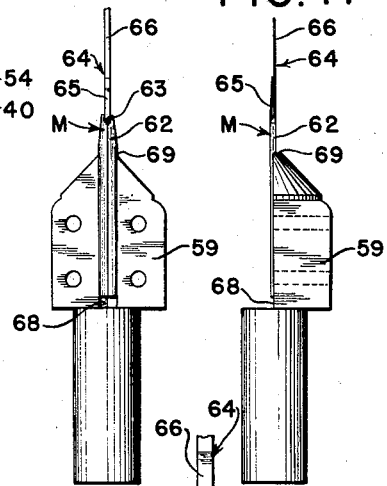
Figure 5:
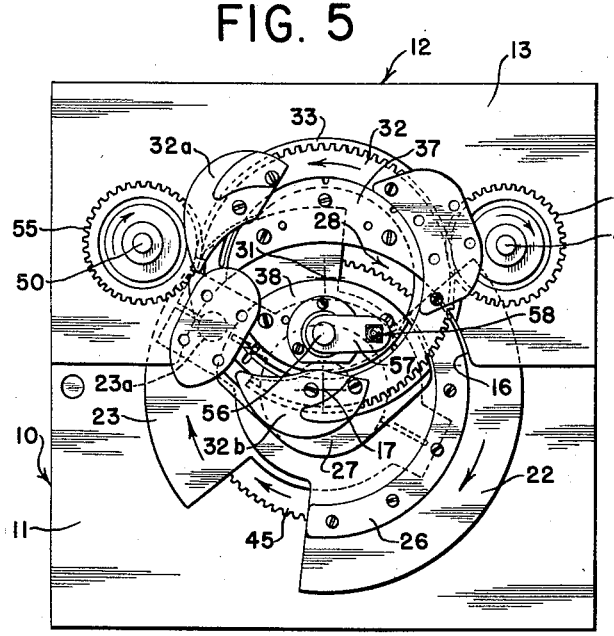
Figure 15:
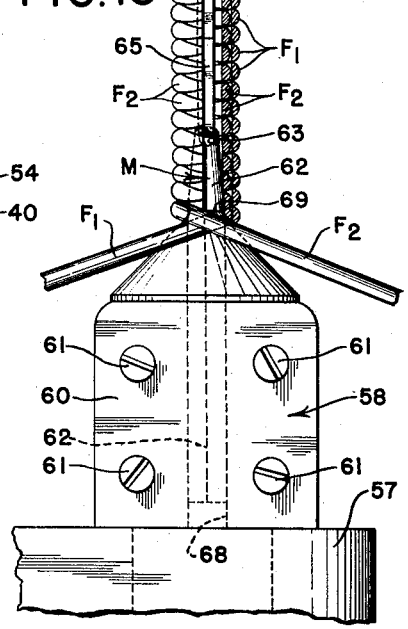
Figure 6:
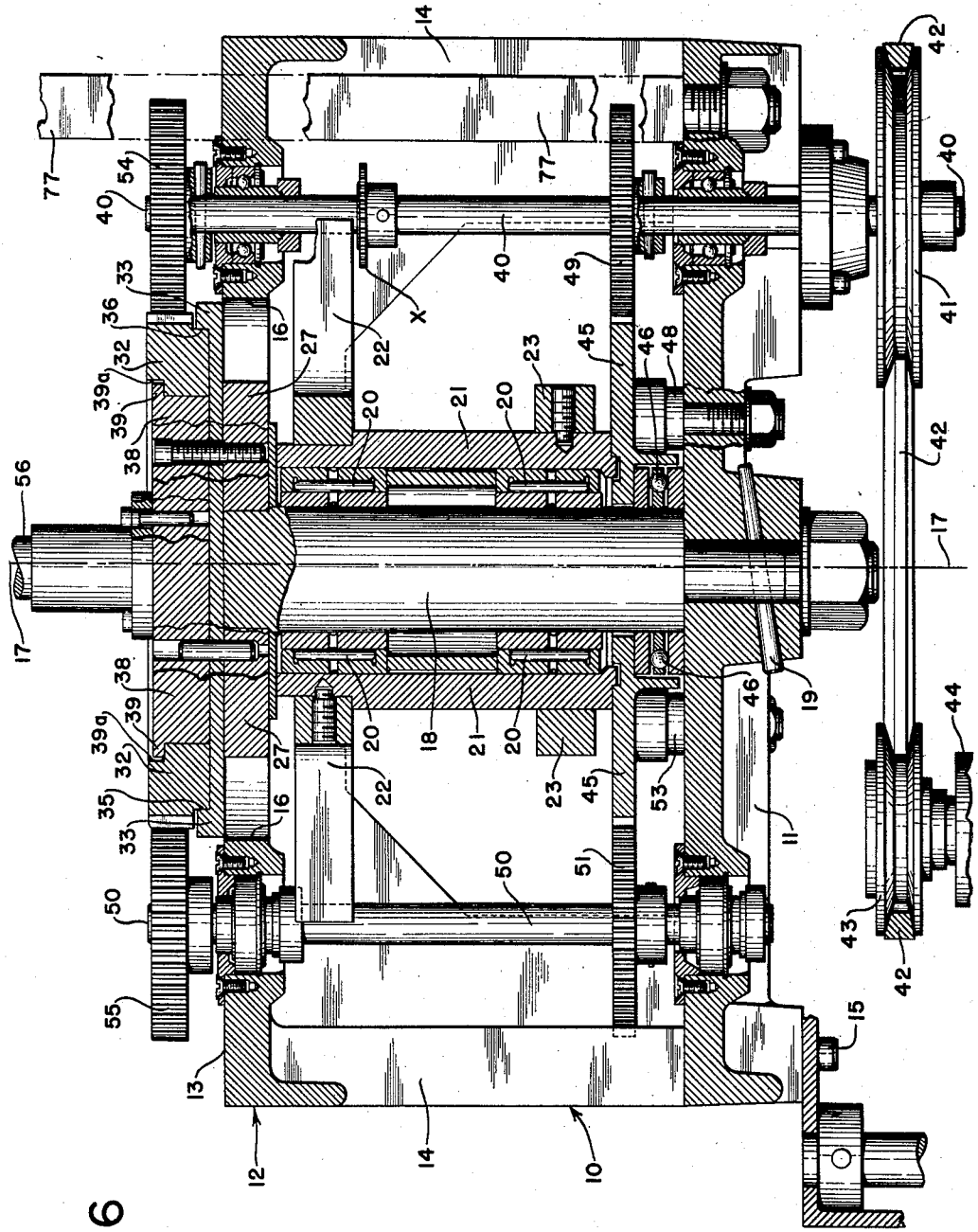
Figure 8:
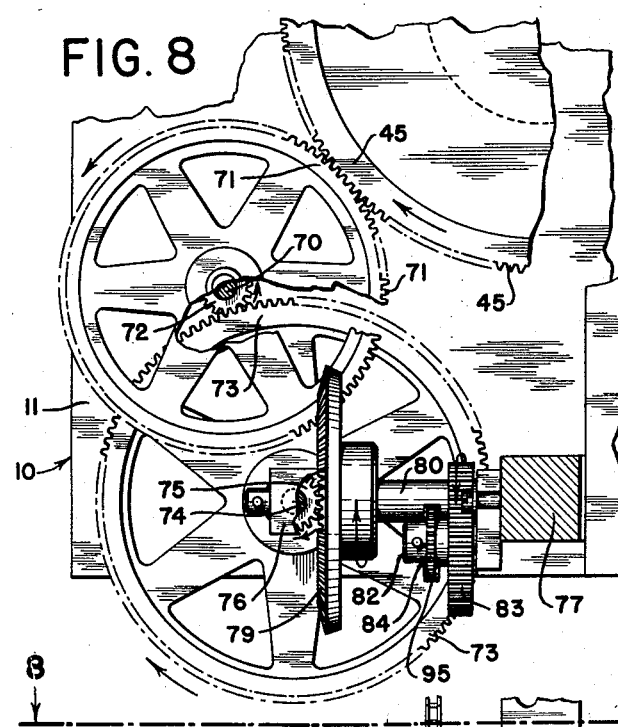
Figure 13:
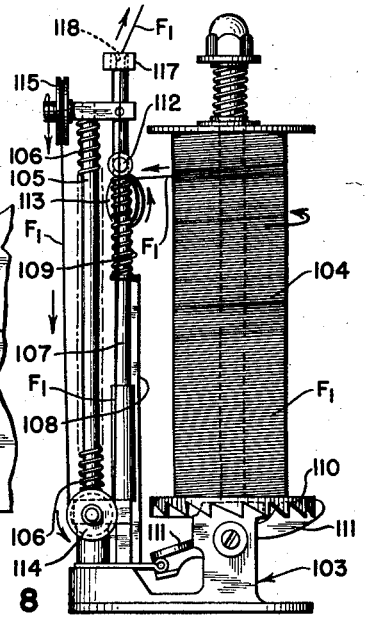
Figure 7:
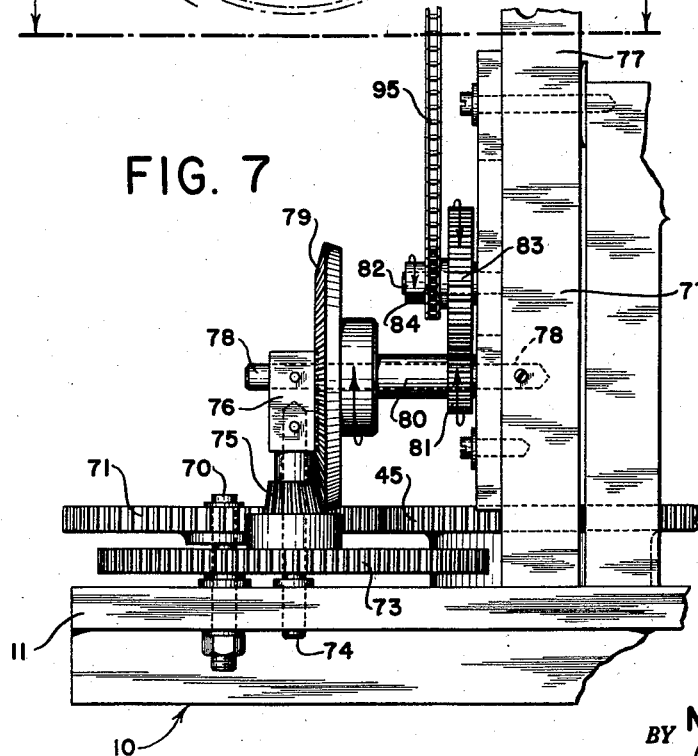
Figure 14:
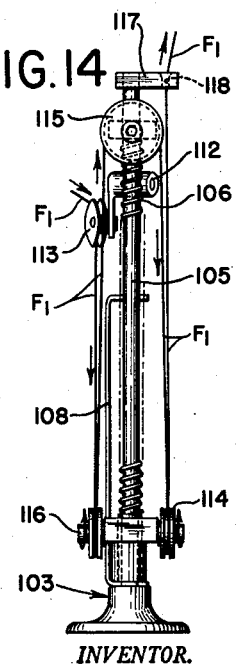

Figs. 4 and 5 are plan views corresponding to Fig. 2. Certain parts of the apparatus appearing in Fig. 2 are omitted in Figs. 4 and 5. Figs. 2, 4 and 5 show three different stages in the operation of the apparatus;

Fig. 6 is an enlarged elevational view of the lower part of the apparatus, partly in section;

Fig. 7 is an enlarged elevational detail of part of the lower portion of the apparatus, the direction of view being normal to that of Fig. 1;

Fig. 8 is the section 8—8 of Fig. 7;

Fig. 9 is an enlarged elevational detail of part of the upper portion of the apparatus, the direction of view corresponding to that of Fig. 1;

Fig. 10 is the section 10—10 of Fig. 9;

Fig. 11 is the section 11—11 of Fig. 10;

Fig. 12 is an elevational view according to the index 12—12 of Fig. 10;

Figs. 13 and 14 are enlarged elevational views from two angles of a preferred spool carrier forming part of the apparatus;

Fig. 15 is an elevational view of a mandrel support and mandrel on which the coils are formed, much enlarged;

Figs. 16 and 17 show details of the mandrel support and mandrel;

Figs. 18 and 19 are much enlarged details of the mandrel;

Fig. 20 is the section 20—20 of Fig. 19;

Fig. 21 is an enlarged fragmentary detail of a mandrel support and a modified mandrel structure; and Fig. 22 is a fragmentary section according to the index 22—22 of Fig. 21.

The product to be manufactured by the apparatus is a continuous pair of releasably interlocking coils, segments of which are useful in the construction of slide fasteners.

The product, designated P (see Fig. 15) is made by winding simultaneously two coil-forming filaments, $F_1$ and $F_2$ (also see Fig. 15), preferably of thermosetting plastic, in opposite directions and in alternating loops around a mandrel in such fashion that each loop or convolution of one coil nestles between adjacent loops of the other coil. The two interlocking coils of filament are carried upward along the mandrel by the pressure of additive loops being formed on the mandrel at the lower end of the product.

The coils are treated, while on the mandrel, or an extension thereof, in suitable manner as by heater H (Fig. 1), to fix or set the filaments in the form of flexible, elongated coils which are then conveyed along the mandrel, or its extension, to the end thereof, at which point the finished product passes into a suitable container by gravity. The product so collected is subsequently cut into desired lengths and assembled in a suitable tape for use in a slide fastener.

The mandrel M (see Figs. 1 and 15–20) is provided at its base with an enlarged sloping shoulder of conical shape, which is herein to be part of a suitable mandrel support. The filaments used have such cross sectional shape that particular sides thereof slide against the sloping shoulder as the advancing filaments pass onto and are wound upon the mandrel, the engagement between such sides and the shoulder preventing rotation of the filaments on their longitudinal axes as they advance. Preferably the filaments have a flat side, and it is this side which engages the shoulder and the mandrel, thereby becoming the inner surface of each loop formed on the mandrel.

Each loop formed slides into pressure contact with the last preceding loop of the other coil as the filament constituting the first named loop is drawn tightly around the mandrel. The process is herein carried out continuously, the formed interlocking coils traveling upwardly on the mandrel due to the pressure mentioned above.

The structure formed on the mandrel comprises a series of nesting alternate loops of the two coils. A supply of each of the two coil-forming filaments, on spools, is carried in proper order around the mandrel support and mandrel, the filaments passing through tensioning devices, as it is advanced to the mandrel.

The mandrel may be regarded as including a conical base and an elongated extension. Herein the base, mandrel proper, and its extension are shown as three separate elements; but it will readily be understood that the base, mandrel proper, and extension might well be fabricated as one integral element, which could be the functional equivalent of the structure shown. In the claims the mandrel is cited as having a conical base and an extension. Essentially the mandrel comprises a rigid conical base having the mandrel proper, a relatively short and rigid bar the cross section of which may be, and preferably is, somewhat diamond-shaped, the bar having two relatively sharp oppositely disposed longitudinal edges separated by the greater transverse dimension of the bar. The bar is also preferably slightly tapered from the conical base upwardly. The elongated extension of the mandrel is preferably a thin, flexible strip leading from the smaller end of the rigid bar constituting the mandrel proper. The extension may be an integral elongation of the bar or may be a flat wire suitably attached to the bar. The shape of the mandrel prevents the filaments from slipping as they are being wound on the mandrel. The rigid base of the mandrel need extend but a relatively short distance upwardly from the mandrel support. Above the base the mandrel is so thin as to be a flexible tape, the width of the tape being smaller than the greatest transverse dimension of the base. The flexible portion of the mandrel may be of considerable length and may be curved at the top of the machine so as to direct the product downwardly, so that as it is continuously fabricated it drops off the end of the mandrel into a suitable storage container.

The mandrel serves not only as a means on which the filaments are wound but also as a means for holding the filaments in interlocked condition until they are set or cured. Thus the mandrel guides the product upwardly through a suitable heating element wherein the coil formations are permanently set.

The material of the filaments may, of course, vary. Where the filaments are thermoplastic, e.g. filaments of polyamides, such as nylon, polyvinylidene chloride, cellulose acetate, polystyrene, or rubber, the structure is usually heated just sufficiently to relieve the strain in the coiled filaments but not sufficiently to fuse the plastic substance, and then cooled.

In certain instances it is advisable to lubricate the filaments or the mandrel, or both, to promote easier sliding of the coils therealong. Soap, oil, paraffin, or other substances non-reactive with the mandrels or coil-forming filaments may be used as lubricants.

If desired, the mandrel proper, i.e., the bar mentioned, may be adjustably above retractable into the mandrel support and its effective length thus varied to adjust the frictional resistance tending to retard the sliding movement of the coils along the mandrel. During winding a subsequent treatment of the coils, bending and twisting of the filaments is caused by the pressure of one convolution on another and this provides means for positive interlocking of the coils when assembled on the tapes of a slide fastener. Also, notching of the filament loops where they cross one another may be caused to occur during the heating step, if desired.

The main frame 10 of the apparatus comprises a horizontal base plate 11 and a table member 12 rigidly mounted thereon, the latter having a platform 13 supported above the base plate by means of legs 14.

The base plate, in the form herein illustrated, is shown to be substantially square. The table member has the shape of an elongated rectangular plate but twice flatwise to form a square U, as seen in Figs. 1 and 6, the intermediate portion corresponding to platform 13 and the extremities corresponding to legs 14. The legs of the table member may be secured to the base plate as by screws 15 (Figs. 1 and 6). The base plate and the table member are preferably castings.

The width of the table member, in the form shown herein, is approximately half the length of a side of the base plate; and, accordingly, the member surmounts only about half the base plate (Figs. 2, 3, 4, and 5). The midportion of the inner longitudinal side is cut away to provide an arcuate bay 16 having an angular measure slightly less than 180°, the center of curvature of the bay being a vertical axis 17 offset horizontally a slight distance away from the inner longitudinal side of platform 13.

Rigidly mounted on the base plate 11 in any suitable manner, for example, that clearly illustrated in Fig. 6, is a cylindrical post 18, the axis of the post being axis 17, above. The post is positively restrained from rotary movement about its axis relative to the base plate by means of a pin 19 clearly shown in Fig. 6.

Rotatably mounted on post 18 by means of roller bearings 20 is a sleeve 21 having rigidly mounted thereon vertically spaced members 22 and 23 at the upper and lower parts respectively of the sleeve, these members being designed approximately to counterbalance each other to prevent whip when the sleeve is rotated. See Fig. 6, an elevational view partly in section and somewhat enlarged to show details of construction; and Figs. 2, 3, 4, and 5, plan views, partly in section.

Rigidly mounted on member 22 is a post 23a; and surmounting this post is a spool carrier generally designated 24, and more particularly described below. Its related spool of filament is indexed 25 (Figs. 1 and 2). Also mounted on member 21, diametrically opposite to carrier 24, is a counterweight 26, the function of which is to neutralize the centrifugal stress introduced by the carrier and its spool during rotation of the structure.

Thus the path of spool 25 is a circular one about axis 17.

Rigidly mounted on the top of post 18 is a horizontally disposed plate 27, coplanar with platform 13 (Fig. 6). Part of plate 27 extends into bay 16, as best shown in Fig. 2, and the outer edge of this part is arcuate and concentric with the bay; but as this part of the plate does not meet the edge of the bay, an arcuate slot 28 is provided, through which, it will presently be made clear, post 23 freely travels when its supporting structure is rotated about axis 17.

Herein it is required that a cooperating carrier 29 with its spool 30 travel in a circular path about another vertical axis offset horizontally with respect to axis 17, the axis of the path of travel of the first mentioned spool, with the two axes so disposed that the circular paths of the two spools intersect (Figs. 2, 4, and 5).

Centered on a vertical axis 31 (see Fig. 2) is a composite bearing for a horizontally rotating split ring gear 32. There are four elements comprising this bearing.

Two of them, 33 and 34, constitute an external bearing structure by which the ring gear is supported and within which it rotates. Element 33 is mounted on platform 13 and element 34 on plate 27, the two elements being separated by slot 28. The two elements functionally a pan, flanged at 35 to engage a smooth shoulder at 36 on the under side of the ring gear (see Fig. 6). Since the entire weight of the ring gear and of member mounted thereon is carried by elements 33 and 34, the upper surfaces of the elements within the flange at 35 are provided with wells for suitable heavy lubricant. It may be seen in Figs. 2, 4, and 5, that element 33 is crescent-shaped and that the periphery of element 34 has the shape of the space outlined at the intersection of two circles of substantially equal diameter where the circles overlay by a measure equal to the common radius.

The inside of the ring gear 32 is smoothly annular except for the interruption relating to the circumferential split. See Figs. 2, 4, and 5. Two other elements 37 and 38 included in the composite bearing provide an internal bearing structure for the gear. These elements serve as additional means for keeping the otherwise free gear centered and also as means for keeping it seated in elements 33 and 34. Element 37 is mounted on element 33 and is also crescent-shaped. Element 38 is mounted on element 34 and is similarly shaped. Elements 37 and 38 together constitute the functional equivalent of a vertical shaft having a flange 39 to prevent the gear 32 from accidentally becoming unseated. Elements 37 and 38, like elements 33 and 34, are separated by the slot at 28.

On the convex side of the slot at 28 the concave edges of elements 33 and 37 coincide. On the concave side of the slot edges of elements 34 and 38 coincide. Elements 37 and 38 are of less periphery than elements 33 and 34 respectively so as to provide an annular path for the ring gear.

Mounted on gear 32 opposite the split thereof is the spool carrier 29 and its spool 30. The path of spool 30 is accordingly a circular one about axis 31—mounted on the horns of the ring gear 32 are counterweights 32a and 32b.

The parts of the apparatus are tuned so that post 23 passes through the split of gear 32 twice during each revolution in known manner, and consequently a braiding effect is rendered available in the filaments being drawn off the spools. See below.

The manner in which the two spool carriers and their spools are caused to travel in two intersecting circular paths will be understood from the following:

The drive shaft 40 of the apparatus is vertically disposed between and journaled in the base plate 11 and the platform 13, and extends both beneath the base plate and above the platform. Mounted on the lower end of shaft 40 is a pulley 41 which is connected by a belt 42 with another pulley 43 keyed on the shaft of a suitable motor 44. See Fig. 1.

Rigidly mounted on the lower end of sleeve 21 just above the base plate 11 is a gear 45. This gear rotates around post 18 on a ball bearing 46. This gear is driven through an idler gear 47 rotatably carried on a stub shaft 8 mounted on the base plate by a gear 49 keyed on the drive shaft 40. See Figs. 1 and 3. This rotary motion is imparted to the structure based on sleeve 21, this structure including spool carrier 24.

Another shaft 50, similar to the drive shaft 40, is vertically disposed between and journaled in the base plate 11 and the platform 13. This shaft is the same distance away from axis 17 as the drive shaft but on the opposite side of a median plane of the apparatus. Keyed on shaft 50 is a gear 51, similar to gear 49. This gear and its shaft are driven by gear 45 through another idler gear 52 which is rotatably carried on a stub shaft 53 mounted on the base plate. The gear train involving (in order from the drive shaft) gears 49, 47, 45, 52, and 51 is best understood from Fig. 3.

Mounted on the upper ends of the drive shaft 40 and shaft 50, above the platform 13, are, respectively, like gears 54 and 55. Each of these gears may mesh with the split ring gear 32, but it will be plain that as the ring gear rotates both are periodically not in mesh at the same time due to the presence of the split of the ring gear at one or the other of gears 54 and 55. However, the ring gear is always being positively driven, either directly by the drive shaft through gear 54, or through the transmission train involving (in order) gears 49, 47, 45, 52 and 51, shaft 50, and gear 55, or directly and indirectly at the same time, depending upon the angular position of the ring gear.

It is readily seen, particularly by reference to Figs. 2 and 3, that the two spool carriers 24 and 29 travel in opposite directions due to the introduction of the two idler gears 47 and 52.

Rigidly mounted on element 38 of the composite bearing structure of the ring gear and centered at a point substantially midway between axes 17 and 31 is a post 56 having at the top thereof a radial arm 57. The arm 57, which may not rotate with respect to post 56, extends therefrom in a direction substantially at right angles to the plane which includes the two axes 17 and 31 (Figs. 1 to 5). Mounted at the outer end of arm 57 is the mandrel M.

In the embodiment shown herein (see, particularly, Figs. 15 to 20) the mandrel is composite, and comprises a base 58 made of two elements 59 and 60, the mandrel proper, designated M, and the mandrel extension, mentioned more particularly below.

The base of the mandrel is not only a support for the mandrel M, but also is a clamp for rigidly holding the mandrel with the latter extending upwardly a desired distance above the conical top of the support. Element 59 is provided with a cylindrical shank to be received in a suitable bore at the outer end of arm 57. That part of element 59 above the shank is similar to element 60. The two elements are held together above the shank by screws 61, and form, as a unit, a square block surmounted by a cone, as best shown in Figs. 15–17. Element 60 is removed in Figs. 16 and 17.

Mandrel M is a rigid bar of hardened material, having preferably a somewhat diamond shaped cross section, as best shown in Fig. 20. The inner surfaces of elements 59 and 60 are provided with vertical grooves to engage the sides of the lower part, or shank, of the mandrel M.

The upper part 62 of the mandrel is tapered. Through an eye at 63 at the upper end of the mandrel a flat wire 64 is passed and then bent flatwise against itself at 65. See Figs. 15–20. The longer portion 66 of the wire may be of considerable length, and may extend to 67 at the top of the apparatus (see Fig. 1).

The base 58 of the mandrel is of sufficient height to prevent the filaments $F_1$ and $F_2$ from catching on post 56 as the two spools 25 and 30 travel around it.

The construction of the mandrel described above and illustrated in Fig. 13 is merely exemplary. Equivalent constructions may be substituted. Also, details of a novel construction for the spool carriers are subsequently set forth. However, here it may be assumed that any suitable spool carriers are employed herein.

The filaments are drawn from the two spools through suitable means for maintaining adequate tension on the filaments, and the ends of the filaments are brought to the mandrel and an initial length of interlocking coils is slowly formed by operating the apparatus manually. After an initial short length of the product has been made which is of sufficient length the apparatus may be operated by motor. Thereafter the product is made automatically in a continuous length until the filament on the spools is exhausted.

The manner in which the filaments are wound into releasably interlocking coils is clearly illustrated in Fig. 15. As the product P is formed at the mandrel the continuous coils slide together upwardly off the mandrel proper and onto the flat wire 64. This wire is carried upward through a heater H and over the top of the machine, ending at 67. Obviously, the interlocking coils cannot separate while they are either on the mandrel or the flat wire; the coils once having been heat treated and then they tend to remain interlocked as well to remain in permanently coiled condition. The finished product descends from the end 67 of the flat wire into a suitable receptacle.

With particular reference to Figs. 7 and 8, it is seen that, rotatably carried on a stub shaft 70 mounted on the base plate 11, is a gear 71 which is in mesh with and is driven by gear 45. Also carried on stub shaft 70 beneath gear 71, and joined to that gear for rotation therewith, is a smaller gear 72. Gear 72 meshes with a gear 73 which is rotatably carried on another stub shaft 74 mounted on the base plate. Also carried on stub shaft 74 above gear 73; and joined to that gear for rotation therewith, is a bevel gear 75. Rigidly mounted on the top of stub shaft 74 is a block 76. A standard (best seen in Fig. 1) 77 rises from the base plate near stub shaft 74 and extends to the top of the apparatus. Another stub shaft 78 extends between block 76 and standard 77; and rotatably mounted on shaft 78 is another bevel gear 79, which is in mesh with bevel gear 75, a sleeve 80, and another gear 81. Bevel gear 79, sleeve 80, and gear 81 are joined together to form a rigid unit. Carried on a stub shaft 82 mounted on standard 77 is a gear 83 and a sprocket 84, the gear 83 meshing with gear 81 and being rigidly joined to the sprocket.

Mounted near the top of standard 77 is a horizontally disposed frame 85; and at the top of the standard is another frame 86. Pivotally carried on stub shaft 87 mounted on standard 77 is a sprocket 88. Pivotally carried on a stub shaft 89 mounted nearby on frame 85 is another sprocket 90. Mounted on a shaft 81 journaled in frame 85 is a sprocket 92; and mounted on a shaft 93 journaled in frame 86 is a sprocket 94. A chain 95 engages all sprockets mentioned by connecting sprockets 84, 88, 92, 94, and 90 in the order named (most fully illustrated in Fig. 1; but also see Figs. 9 to 12, showing enlarged details of the upper part of the apparatus). Thus it will be clear that shafts 91 and 93 are rotated in timed relationship with the other moving parts of the apparatus.

Mounted on shaft 91 (see Fig. 11) is a rotary element 96 which comprises two peripherally toothed disks separated by another disk of less diameter. Carried on a shaft 97 proximate to shaft 91 near one end of frame 85 is a like rotary element 98. These two rotary elements are coplanar but not in mesh and are normally separated by the product of the apparatus which passes vertically between them. Mounted on shaft 93 is a similar rotary member 99; and carried on a shaft 100 proximate to shaft 93 near one end of frame 86 is another similar rotary element 101. These last mentioned elements, 99, and 101, are coplanar, but not in mesh, and are arranged with one above the other, whereby the product of the machine may be passed horizontally between them. Extending from one end of frame 85 by way of frame 86 to the other end of frame 85 is U-shaped guide 102 through which the product passes and in which it is supported.

The interlocked coils move between the two pairs of rotary elements, 96 and 98, and 99 and 101 in the manner of a double faced rack moving between two independent pinions each engaging one face of the rack. The points of the teeth of the rotary elements enter slightly between adjacent loops of the coils, and the driven elements 96 and 99 serve to control the advance of the product. The idler elements 98 and 101 serve merely to keep the product in engagement with elements 96 and 99 respectively. Thus the product is carried over the upper part of the apparatus through guide 102, and its direction of travel is reversed, as shown, so that the completed product may feed by gravity into a suitable storage container (not shown).

A preferred spool carrier structure 103 is shown in detail in Figs. 13 and 14. This comprises a spool 104 carrying, for example, a filament $F_1$. Rigidly mounted on the base of the carrier 103 is a standard 105. Adjacent to standard 105 is a standard 107. Mounted adjacent to the last named standard is a bracket 108. Surrounding standard 107 and resting upon bracket 108 is a compression spring 109. The spring 109 is maintained under tension by means of a lug 112 having rotatably mounted thereon a pulley 113. Slidably mounted on standard 105 is a member 114. This member is normally urged toward the base of the carrier by means of a compression spring 106. Rotatably mounted on member 114 is a pulley 114a. Rotatably mounted on the top of standard 105 is another pulley 115. Also rotatably mounted on member 114 is a third pulley 116. The top of standard 107 supports a head piece 117 having a conical slot 118 therein through which filament is fed. The bottom of the spool is provided with a ratchet 110 which is controlled in usual manner by a dog 111 in accordance with tension to which the unwinding filament is subjected, the dog being actuated in response to movement of member 114.

Figs. 13 and 14 are both elevational views of the preferred carrier and are seen at two angles separated by 90°. The spool is shown only in Fig. 13; but the filament is indicated in both figures. Arrows indicate rotational directions and directions of movement of the filament.

The filament $F_1$ leaves the spool 104, as indicated in both figures; passes over pulley 113 and then downwardly under and around pulley 116; and then upwardly and over pulley 115; then downwardly under and around pulley 114a and then upward through the conical slot 118 of head piece 117; and thence to the mandrel.

It will be seen by this construction that a substantially uniform tension is maintained on the filament as it approaches the mandrel. When the carrier is traveling at its greater distances from the mandrel, the tension on filament $F_1$ is naturally increased, and the pull of the filament operates to raise pulleys 114a and 116a and member 114 against compression spring 106, thereby decreasing the tension. Obviously as the carrier arrives at those angular positions where the distance from the spool to the mandrel is less, the compression spring 106 forces member 114 downwardly and thereby checks spool 104 from rotary movement. In usual manner as soon as the tension of the filament increase member 114 is raised by the pull of the filament on pulleys 114a and 116, and dog 111 is dropped out of acknowledgement with ratchet 110, and the spool 104 is free to rotate that slight amount necessary to supply additional filament.

Figs. 21 and 22 illustrate a modified mandrel structure. In place of mandrel M, previously described, a composite mandrel, generally designated $M^1$, is substituted, and may be mounted between elements 59 and 60 in usual manner, although the pattern of the grooves provided in these elements is necessarily slightly changed to accommodate the new structure. Mandrel $M^1$ comprises, essentially, two needles 119 and 120, which may be placed side by side in actual contact, or which may be separated by a shim 121, and a thin strip 122, preferably of steel. The component parts of the mandrel $M^1$, as shown in Figs. 21 and 22, are fasces-like between the elements 59 and 60, as best shown in the sectional view, Fig. 22. The width of the strip 122, which is functionally equivalent to the flat wire mandrel extension 66 previously described, is substantially equal to the distance between the parallel axes of the needles. It will be seen in Fig. 22 that the general cross section of the composite mandrel $M^1$ is of greater width than thickness, like mandrel M.

I claim:

1. The method of making a separable fastener which comprises simultaneously turning spirally about a mandrel of non-circular cross section two filaments in opposite directions, one filament being spiraled about said mandrel and about one of two parallel axes and the other filament being spiraled about said mandrel and about the other of said two axes, each filament being of oblong cross section and with one filament continuously engaging the other filament, with said filaments spirally nestling but not crossing each other.

2. The method of claim 1 in which the filaments are of thermoplastic material, and including the steps of heating the spirally nestling filaments and then cooling the same to set them in such condition.

3. The method of claim 1, including withdrawing said interlocking coils from said mandrel by means of cooperating spurs meshing with the filaments of said coils, said spurs being driven in time relationship with said winding operations.

4. The method of making a separable fastener which comprises consecutively delivering in alternative relationship to each other two filaments of oblong cross section to a stationary mandrel, said mandrel being of non-circular cross section, each filament progressing longitudinally from one of two sources, each source moving in a different direction and in one of two circular orbits which surround the mandrel and also intersect each other, the mandrel being nearer to one intersection of said orbits than to the other thereof, and meshing the filaments together on said mandrel but not crossing them.

5. The method of claim 4 wherein the filaments are of thermoplastic material, and including the steps of heating the meshed filaments and then cooling the same to set them permanently in such condition.

6. Apparatus for forming interlocking coils comprising a tapered mandrel locked against rotation, said mandrel comprising two needles in parallelism side by side having points, such points both extending in the same direction, and a wire of oblong cross section engaging both needles in parallelism therewith and extending therebeyond.

References Cited in the file of this patent

UNITED STATES PATENTS

| 341,974 | Wells | May 18, 1886 |
| 1,611,619 | Turck | Dec. 21, 1926 |
| 2,024,104 | Krissiep et al. | Dec. 10, 1935 |
| 2,504,020 | Hanson | Apr. 11, 1950 |
| 2,541,728 | Wahl | Feb. 13, 1951 |
| 2,541,729 | Wahl | Feb. 13, 1951 |
| 2,588,525 | Hertenstein | Mar. 11, 1952 |

FOREIGN PATENTS

| 914,067 | France | Sept. 27, 1946 |
| 579,402 | Great Britain | Aug. 1, 1956 |